US006231976B1

(12) United States Patent
Dean et al.

(10) Patent No.: US 6,231,976 B1
(45) Date of Patent: *May 15, 2001

(54) COPOLYESTER BINDER FIBERS

(75) Inventors: Leron R. Dean; William A. Haile; Richard L. McConnell, all of Kingsport, TN (US)

(73) Assignee: Eastman Chemical Company, Kingsport, TN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 37 days.

(21) Appl. No.: 09/369,299

(22) Filed: Aug. 6, 1999

Related U.S. Application Data

(63) Continuation-in-part of application No. 09/187,004, filed on Nov. 6, 1998, now Pat. No. 6,132,868, which is a continuation of application No. 09/143,437, filed on Aug. 28, 1998, now Pat. No. 6,197,856.
(60) Provisional application No. 60/064,717, filed on Nov. 6, 1997, and provisional application No. 60/057,800, filed on Aug. 28, 1997.

(51) Int. Cl.$^7$ .............................. D02G 3/00; C08G 63/00; C08F 20/00
(52) U.S. Cl. .................... 428/373; 528/272; 528/279; 528/280; 528/286; 528/288; 528/298; 528/302; 528/307; 528/308; 528/308.6; 428/364; 428/374; 525/437; 525/444; 525/445
(58) Field of Search .................. 528/272, 279, 528/280, 286, 288, 298, 302, 307, 308, 308.6; 428/364, 373, 374; 525/437, 444, 445

(56) References Cited

U.S. PATENT DOCUMENTS

| Re. 32,765 | 10/1988 | Callander et al. ................. 524/382 |
|---|---|---|
| 2,901,466 | 8/1959 | Kibler et al. ............................. 260/75 |
| 3,589,956 | 6/1971 | Kranz et al. ......................... 156/62.4 |
| 3,907,754 | 9/1975 | Tershansy et al. ..................... 260/75 |
| 3,962,189 | 6/1976 | Russin et al. ....................... 260/75 R |
| 4,010,145 | 3/1977 | Russin et al. ....................... 260/75 R |
| 4,081,428 | 3/1978 | Thompson ............................. 260/75 |
| 4,093,603 | 6/1978 | Jackson, Jr. et al. .............. 260/75 R |
| 4,094,721 | 6/1978 | Sturm et al. .......................... 156/309 |
| 4,116,942 | 9/1978 | Weinberg et al. .................... 528/283 |
| 4,189,338 | 2/1980 | Ejima et al. .......................... 156/167 |
| 4,217,426 | 8/1980 | McConnell et al. .................. 525/173 |
| 4,340,526 | 7/1982 | Petke et al. ........................... 524/292 |
| 4,356,299 | 10/1982 | Cholod et al. ....................... 528/279 |
| 4,419,507 | 12/1983 | Sublett ................................ 528/302 |
| 4,450,250 | 5/1984 | McConnell et al. .................. 524/141 |
| 4,468,490 | 8/1984 | Meyer, Jr. et al. ................... 524/311 |
| 4,521,556 | 6/1985 | Adams ................................. 524/88 |
| 4,540,749 | 9/1985 | Meyer, Jr. et al. .................. 525/437 |

(List continued on next page.)

FOREIGN PATENT DOCUMENTS

| 197 15 682 A1 | 10/1997 | (DE) . |
|---|---|---|
| 0 517 171 A2 | 12/1992 | (EP) . |
| 0 526 645 A1 | 2/1993 | (EP) . |
| 532 988 A1 | 3/1993 | (EP) . |
| 542 239 A1 | 5/1993 | (EP) . |
| 1 029 136 | 5/1962 | (GB) . |
| 977 104 | 12/1964 | (GB) . |
| 1047072 | 11/1966 | (GB) . |
| 1053374 | 12/1966 | (GB) . |
| 1344492 | 1/1974 | (GB) . |
| 63-203818 | 8/1988 | (JP) . |
| 5-005212 | 1/1993 | (JP) . |
| 5059616 | 3/1993 | (JP) . |
| 5097985 | 4/1993 | (JP) . |
| 8092816 | 4/1996 | (JP) . |
| 8245778 | 9/1996 | (JP) . |
| WO 84/02144 | 6/1984 | (WO) . |
| WO 96/04422 | 2/1996 | (WO) . |
| WO 96/15173 | 5/1996 | (WO) . |
| WO 96/15174 | 5/1996 | (WO) . |
| WO 96/15175 | 5/1996 | (WO) . |
| WO 96/15176 | 5/1996 | (WO) . |
| WO 96/25446 | 8/1996 | (WO) . |
| WO 96/25448 | 8/1996 | (WO) . |
| 97/30102 | 8/1997 | (WO) . |
| WO 98/12245 | 3/1998 | (WO) . |
| 99/10573 | 3/1999 | (WO) . |
| 99/24648 | 5/1999 | (WO) . |

OTHER PUBLICATIONS

"Chemical Substances of Melty," Unitika Ltd., Product Brochure, Apr. 1993.
"Types of Bellcombi," Kanebo Ltd., Product Brochure.
"Textile Fibers Group Hoechst Celanese Corporation," Hoechst Celanese, Product Brochure.
"Improved Color Poly(ethylene/1,4–cyclohexylenedimethylene terephthalate)," Research Disclosure, No. 359, Mar. 1994, pp. 142–44.
R. Bass, "PCT and PETG Polyester Fibers for Nonwovens," INDA–TEC 96, Nonwovens Conference, 1996, pp. 19.1–19.9.
International Search Report, dated Apr. 8, 1999, in International Application No. PCT/US98/23599.
International Search Report, dated Feb. 2, 1999, in International Application No. PCT/US98/17813.

*Primary Examiner*—Samuel A. Acquah
(74) *Attorney, Agent, or Firm*—Cheryl Tubach; Harry J. Gwinnell

(57) ABSTRACT

The invention relates to fibers, particularly binder fibers, made from copolyesters and the copolyesters themselves. The copolyesters of the invention are generally formed from a glycol component containing 1,3- or 1,4-cyclohexanedimethanol and ethylene glycol and at least one dicarboxylic acid component. Such copolyesters may be formed into a variety of products, especially binder fibers for nonwoven fabrics, textile and industrial yarns, and composites.

42 Claims, No Drawings

U.S. PATENT DOCUMENTS

| | | | |
|---|---|---|---|
| 4,576,997 | 3/1986 | Trotter et al. | 525/444 |
| 4,668,453 | 5/1987 | Ebnesajjad et al. | 264/78 |
| 4,668,764 | 5/1987 | Satou | 528/308 |
| 4,740,581 | 4/1988 | Pruett et al. | 528/289 |
| 4,745,174 | 5/1988 | Pruett et al. | 528/289 |
| 4,749,772 | 6/1988 | Weaver et al. | 528/288 |
| 4,749,773 | 6/1988 | Weaver et al. | 528/288 |
| 4,749,774 | 6/1988 | Weaver et al. | 528/288 |
| 4,950,732 | 8/1990 | Weaver et al. | 528/288 |
| 4,999,388 | 3/1991 | Okamoto | 523/400 |
| 5,017,680 | 5/1991 | Sublett | 528/274 |
| 5,057,561 | 10/1991 | Manica et al. | 524/68 |
| 5,106,944 | 4/1992 | Sublett | 528/279 |
| 5,166,311 | 11/1992 | Nichols | 528/285 |
| 5,219,941 | 6/1993 | Meyer, Jr. et al. | 525/173 |
| 5,252,699 | 10/1993 | Chamberlin et al. | 528/289 |
| 5,292,783 | 3/1994 | Buchanan et al. | 524/37 |
| 5,312,797 | 5/1994 | Takiguchi et al. | 503/227 |
| 5,340,907 | 8/1994 | Yau et al | 528/274 |
| 5,340,910 | 8/1994 | Chamberlin et al. | 528/289 |
| 5,348,699 | 9/1994 | Meyer et al. | 264/176.1 |
| 5,372,864 | 12/1994 | Weaver et al. | 428/36.92 |
| 5,384,377 | 1/1995 | Weaver et al. | 525/437 |
| 5,385,773 | 1/1995 | Yau et al. | 428/221 |
| 5,393,863 | 2/1995 | Yau et al. | 528/308.4 |
| 5,393,871 | 2/1995 | Yau et al. | 528/308.4 |
| 5,446,079 | 8/1995 | Buchanan et al. | 524/41 |
| 5,453,479 | 9/1995 | Borman et al. | 528/279 |
| 5,559,171 | 9/1996 | Buchanan et al. | 524/41 |
| 5,563,236 | 10/1996 | Murata et al. | 528/295 |
| 5,580,911 | 12/1996 | Buchanan et al. | 524/41 |
| 5,599,858 | 2/1997 | Buchanan et al. | 524/41 |
| 5,608,031 | 3/1997 | Yau et al. | 528/281 |
| 5,643,991 | 7/1997 | Stipe et al. | 524/496 |
| 5,656,715 | 8/1997 | Dickerson et al. | 528/271 |
| 5,656,716 | 8/1997 | Schmidt et al. | 528/279 |
| 5,668,243 | 9/1997 | Yau et al. | 528/280 |
| 5,681,918 | 10/1997 | Adams et al. | 528/279 |
| 5,688,899 | 11/1997 | Strand et al. | 528/279 |
| 5,744,571 | 4/1998 | Hilbert et al. | 528/272 |
| 5,773,554 | 6/1998 | Dickerson et al. | 528/271 |
| 5,889,135 | 3/1999 | Warzelhan et al. | 528/176 |

COPOLYESTER BINDER FIBERS

PRIORITY DATA

This application is a C-I-P of copending U.S. application pending Ser. No. 09/143,437 entitled "Improved Copolymer Binder Fibers," filed on Aug. 28, 1998, now Pat. No. 6,197,856, which claims benefit under 35 U.S.C. § 119 of provisional application 60/057,800 filed Aug. 28, 1997 and a cont-in-part U.S. application Ser. No. 09/187,004 entitled "Copolyester Binder Fibers" filed on Nov. 6, 1998 U.S. Pat. No. 6,132,868 which claims benefit under 35 U.S.C. § 119 of provisional application 60/064,717 filed Nov. 6, 1997. The disclosures of these applications are incorporated by reference herein in their entirety.

FIELD OF THE INVENTION

The invention relates to fibers, particularly binder fibers, made from copolyesters and the copolyesters themselves. The copolyesters of the invention are generally formed from a glycol component containing 1,3- or 1,4-cyclohexanedimethanol and ethylene glycol and at least one dicarboxylic acid component. Such copolyesters may be formed into a variety of products, especially binder fibers for nonwoven fabrics, textile and industrial yarns, and composites.

BACKGROUND OF THE INVENTION

Nonwoven fabrics are widely used in a variety of products. For example, nonwoven fabrics are suitable for use in filters, roofing materials, composites, backing materials, linings, insulation, medical/surgical applications, bedding, tablecloths, and diapers. High loft batting nonwoven fabrics are used in a wide variety of products, including comforters, robe wear, and bra cups. Generally nonwoven fabrics are based on polyester, acrylic, nylon, glass and cellulosic fibers which may be bonded with latex adhesives, binder fibers, or polymers in powder form. The bonding of nonwoven fabrics with binder fibers provides a convenient method for making nonwoven fabrics without the need for water-based adhesives which are less environmentally friendly. Nonwoven fabrics bonded with binder fibers are economical to produce, and provide a method for making articles, which are unique or superior in performance. Other applications are uses in yarns to increase strength or reduce pilling, and uses in prepregs, preforms and a wide range of composite structures.

Certain copolyesters have been found to be useful as binder fibers. For example, polyethylene terephthalate (PET) copolyesters containing 1,4-cyclohexanedimethanol having inherent viscosity (I.V.) values in the range of about 0.6 to about 0.8 dl/g have been used in the past as binder fibers to bond polyester or other fibers. Copolyesters with lower I.V. values, however, were believed to not have adequate bonding strength.

It is well known that copolyesters can be prepared by processes involving polyesterification and polycondensation. Generally, as described in U.S. Pat. Nos. 2,901,466, 5,017,680, 5,106,944 and 5,668,243, the reactants include glycol components and dicarboxylic acid components. Typically, one dicarboxylic acid component is terephthalic acid and one dihydric alcohol is ethylene glycol. Such copolyesters are relatively inert, hydrophobic materials which are suitable for a wide variety of uses, including, molded articles, such as those used in the automobile and appliance industries, food trays, fibers, sheeting, films and containers, such as bottles. The use of ethylene glycol as the only diol, however, is accompanied by undesirable properties such as yellow discoloration and weak fiber binding properties. Indeed, such polymers tend to be opaque, crystalline polymers with high melting temperatures which may make them unsuitable for use as binder fibers. To remedy the problems with polyethylene terephthalates, polyethylene terephthalate copolyesters have been formed with 1,4-cyclohexanedimethanol or isophthalic acid.

Previous attempts at forming copolyesters with 1,4-cyclohexanedimethanol and terephthalic acid have focused upon copolyesters having high inherent viscosities, I.V., of greater than 0.6, due to the belief that low inherent viscosities would not possess adequate strength. In particular, it was believed that low inherent viscosity copolyesters were unable to provide adequate bonding strength to form commercially acceptable binder fibers. Indeed, previous polyethylene terephthalate copolyesters containing 1,4-cyclohexanedimethanol were made with inherent viscosities ranging from 0.6 to 0.8 dl/g to form binder fibers to bond polyesters or other fibers. However, such attempts have not been entirely successful in providing copolyesters having the desired high clarity and hue or bonding capability at low activation temperatures when in the form of a binder fiber.

Other attempts at forming copolyesters suitable for use as binder fibers have focused on polyethylene terephthalate copolyesters which have been formed with isophthalic acid and diethylene glycol. Such attempts have resulted in unicomponent and bicomponent binder fibers sold as BELLCOMBI® available from Unitika of Osaka, Japan, MELTY® available from Kanebo, Ltd. of Osaka, Japan, CELBOND® available from KoSa and the like. These products however, have failed to recognize the clarity, bonding temperature, bonding strength and cost benefits of forming copolyesters containing both isophthalic acid and 1,3- or 1,4-cyclohexanedimethanol.

There exists a need in the art for cost-effective copolyesters formed from 1,3- or 1,4-cyclohexanedimethanol, ethylene glycol, isophthalic acid and at least one dicarboxylic acid selected from terephthalic acid, naphthalenedicarboxylic acid, 1,3- or 1,4-cyclohexanedicarboxylic acid or esters thereof. Such copolyesters possess improved clarity and color as well as improved binder fiber bonding strength at low activation temperatures.

SUMMARY OF THE INVENTION

The invention answers the problems connected with previous binder fibers and copolyesters by providing binder fiber copolyesters having excellent color, thermoplastic flow and increased bonding versatility as well as catalysts for producing such copolyesters. The copolyesters of the invention are suitable for use in a wide variety of applications, such as binder fibers for making nonwoven fabrics and textile and industrial yarns.

More specifically, the invention provides copolyesters which are prepared with glycol 25 components and dicarboxylic acid components. The glycol component generally contains 1,3-and/or 1,4-cyclohexanedimethanol in an amount ranging from about 5 to 60 mole %, 1,3-propanediol in an amount of up to about 55 mole % and ethylene glycol in an amount ranging from about 40 to about 95 mole %. The dicarboxylic acid component generally contains at least about 50 mole % of an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof. In one preferred embodiment, the dicarboxylic acid component generally contains an acid, anhydride, acid chloride or ester of isophthalic acid in an amount ranging from at least 10 mole % to about 50 mole % and at least about 50 mole % of a dicarboxylic acid component selected from the group consisting of acids or esters of terephthalic acid, naphthalenedicarboxylic acid, 1,3- or 1,4-cyclohexanedicarboxylic acid and mixtures thereof.

The copolyester of the invention is formed such that the resulting copolyesters have excellent thermoplastic flow and bonding capability. Typically, the inherent viscosities of the copolyester is less than about 0.7 dl/g when employing greater than 10 mole % isophthalic acid, anhydride, acid chloride or ester thereof and less than about 0.6 dl/g when employing less than about 10% isophthalic acid, anhydride, acid chloride or ester thereof. Indeed, the copolyesters of the invention are particularly suited for use as binder fibers because the copolyesters can possess a lower I.V. which allows improved bonding of the binder fiber for nonwoven fabrics at relatively low temperatures. The invention is discussed in more detail below.

DETAILED DESCRIPTION OF THE INVENTION

The invention relates to fibers, particularly binder fibers, made from copolyesters, as well as the copolyesters themselves. The copolyesters of the invention tend to possess excellent color as they are generally clearer, exhibit a more neutral hue or a brighter appearance than previous polyesters and may accept dyes more easily than previous copolyesters. Indeed, with the invention, clear and non-opaque copolyester polymers may be formed and readily be processed into binder fibers having excellent binding properties. Furthermore, the processing of the copolyesters into binder fibers may be aided through the use of the lower melt spinning temperatures of the preferred lowered I.V. copolyesters of the invention. For example, a 0.47 I.V. copolyester of the invention can be spun as low as 215° C.

The copolyesters of the invention are formed from the reaction of a glycol component and 5 a dicarboxylic acid component. Generally, the glycol component comprises 1,3- or 1,4-cyclohexanedimethanol in an amount ranging from about 5 to 60 mole %, ethylene glycol in an amount ranging from about 40 to about 95 mole % and 1,3-propanediol in an amount of up to about 55 mole %. The dicarboxylic acid component generally contains at least about 50 mole % of an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof. These features and others are discussed in more detail below.

Glycol Component

As mentioned above, the glycol component generally comprises 1,3- and/or 1,4-cyclohexanedimethanol in an amount ranging from about 5 to 60 mole %. Preferably the 1,3-and/or 1,4-cyclohexanedimethanol is present in an amount ranging from about 5 to about 40 mole % and more preferably in an amount ranging from about 8 to about 35 mole %.

Generally, ethylene glycol is present in the glycol component in an amount ranging from about 40 to about 95 mole %. Preferably the ethylene glycol is present in an amount ranging from about 60 to about 95 mole % and more preferably about 65 to about 92 mole %. A preferred glycol component is formed with only 1,3- and/or 1,4-cyclohexanedimethanol and ethylene glycol. Generally, the 1,3- or 1,4-cyclohexanedimethanol may be a cis-, trans-, or cis/trans mixture of isomers with the 1,4-cyclohexanedimethanol being preferred.

Additionally, in another embodiment of the invention, when the dicarboxylic acid component contains less than about 10 mole % isophthalic acid or anhydride, acid chloride or ester thereof, it is preferred that 1,3- or 1,4-cyclohexanedimethanol is present in an amount ranging from about 20 to about 40 mole %, most preferably about 25 to about 35 mole % and ethylene glycol is present in an amount of from about 60 to about 80 mole % and preferably about 65 to about 75 mole %.

In addition to the 1,3- or 1,4-cyclohexanedimethanol and ethylene glycol, the glycol component may include up to about 55 mole %, and preferably up to 30 mole %, more preferably up to 10 mole % 1,3-propanediol. Likewise the glycol component may contain up to about 20 mole %, and preferably up to about 4 mole % diethylene glycol. Furthermore the glycol component may also include up to about 10 mole % of conventional glycols including, but not limited to, glycols containing about 3 to about 12 carbon atoms such as propylene glycol, 10 1,4-butanediol, 1,5-pentanediol, 1,6-hexanediol, 2,2,4-trimethyl-1,3-propanediol, 2-ethyl-2-butyl-1,3-propanediol, 2,2,4,4-tetramethyl-1,3-cyclobutanediol, 2,4-dimethyl-2-ethyl-1,3-hexanediol, 2-ethyl-2-isobutyl-1,3-propanediol, 1,3-butanediol, 1,8-octanediol, 2,2,4-trimethyl-1,6-hexanediol, thiodiethanol, and 1,2-cyclohexanedimethanol. The cyclohexanedimethanol moieties may be present as the cis-, trans- or as a mixture of isomers. Small amounts of polymeric glycols such as poly(tetramethylene glycol) or poly(ethylene glycol) may also be used. In using such polymeric glycols, molecular weights ranging from 200 to 5000 are suitable.

Dicarboxylic Acid Component

The dicarboxylic acid component generally contains at least about 50 mole % of an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof. Preferably, the dicarboxylic acid component contains at least about 80 mole % and more preferably at least about 90 mole % of an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof. In one preferred embodiment of the invention, the dicarboxylic acid component contains about 90% or more of an acid, ester or anhydride of terephthalic acid, napthalenedicarboxylic acid, and 1,3- or 1,4-cyclohexanedicarboxylic acid. In this embodiment, it is most preferred that the dicarboxylic acid component is an ester or acid of terephthalic acid.

In another preferred embodiment of the invention, the dicarboxylic acid component contains an acid, ester or anhydride of isophthalic acid in an amount ranging from at least 10 mole % to about 50 mole % and at least about 50 mole % of a dicarboxylic acid component selected from the group consisting of acids, anhydrides or esters of terephthalic acid, naphthalenedicarboxylic acid, 1,3- or 1,4-cyclohexanedicarboxylic acid and mixtures thereof. For this embodiment, depending upon the equipment used, the preferred dicarboxylic acid component contains either isophthalic acid and terephthalic acid or isophthalic acid and dimethyl terephthalate or dimethyl isophthalate and dimethyl terephthalate.

It should be noted that any of the naphthalenedicarboxylic acid isomers or mixtures of isomers may be used with the 1,4-, 1,5-, 2,6- and 2,7- isomers being preferred with the 2,6-isomer being most preferred. Additionally, the 1,3- or 1,4-cyclohexanedicarboxylic acid moieties may be as the cis-, trans- or cis/trans mixtures of isomers.

Suitable additional dicarboxylic acid components which may be added in amounts up to about 10 mole % of the dicarboxylic acid component, generally contain about 4 to about 40 carbon atoms, for example, an acid or ester of an aromatic, aliphatic or cycloaliphatic dicarboxylic acid. Suitable additional dicarboxylic acids or esters are described in U.S. Pat. Nos. 5,608,031 and 5,668,243, herein incorporated by reference in their entirety. Particularly preferred examples of additional dicarboxylic acid components include, but are not limited to, sulfoisophthalic acid, 1,4-cyclohexanediacetic acid, diphenyl-4,4'-dicarboxylic acid, and dimer acid. Copolyesters may be prepared from one or more of the above dicarboxylic acids.

Amine Compounds

It is also possible to form the copolyesters of the invention in the presence of up to about 20 mole % of an amine compound. Suitable amine containing compounds, include, but are not limited to, aminoalcohols and diamines in an amount of up to about 20 mole % of the glycol component or amine compounds such as aminoacids and lactams in an amount of up to about 20 mole % of the dicarboxylic acid component. The presence of the aminoalcohols, aminoacids, diamines or lactams in the glycol and dicarboxylic acid components provides for the formation of polyesteramides. These polyesteramides having an I.V. of 0.7 dl/g or less, have good binder fiber properties and, in addition, have excellent dyeing characteristics. In particular, deeper dyeing may be achieved through the use of the polyesteramides as compared to unmodified polyethylene terephthlate having the same I.V.

Generally, aminoalcohols for the invention include, but are not limited to, 2-aminoethanol and 4-aminomethylcyclohexanemethanol. Typical diamines include, but are not limited to, ethylenediamine, trimethylenediamine, tetramethylenediamine, pentamethylenediamine, hexamethylenediamine, octamethylenediamine, dodecamethylenediamine and 1,4-cyclohexane-bis-methylamine. Additionally, examples of suitable lactams include, but are not limited to, caprolactam, laurolactam and azacyclododecan-2-one.

Branching Agents

Copolyesters of the invention may be linear or branched. By adding a branching agent to the reaction of the glycol and dicarboxylic acid components, the melt strength of the resulting copolyester may be increased. Small amounts, typically less than about 2 mole %, of conventional branching agents may be reacted with the glycol component and dicarboxylic acid component to form the inventive polyesters. Conventional branching agents include polyfunctional acids, anhydrides, alcohols and mixtures thereof. Examples of suitable branching agents, include, but are not limited to, trimellitic anhydride, pyromellitic dianhydride, glycerol, trimethylolpropane, and pentaerythritol.

Reaction Process for Forming the Copolyesters

In forming the copolyesters of the invention, the reaction of the glycol component and the dicarboxylic acid component may be carried out using conventional polyester polymerization conditions. For example, when preparing the copolyesters by means of an ester interchange reaction, i.e., from the ester form of the dicarboxylic acid components, the reaction process may comprise two steps. In the first step, the glycol component and the dicarboxylic acid component, such as, for example, dimethyl isophthalate and dimethyl terephthalate, are reacted at elevated temperatures, typically, about 180° C. to about 280° C. and pressures ranging from about 0.0 to about 60 psig. Preferably, the temperature for the ester interchange reaction ranges from about 190° C. to about 240° C. while the preferred pressure ranges from about 15 psig to about 40 psig. Thereafter, the reaction product is heated under still higher temperatures and under reduced pressure to form polyester with the elimination of glycol, which is readily volatilized under these conditions and removed from the system. This second step, or polycondensation step, is continued under higher vacuum and a temperature which generally ranges from about 240° C. to about 300° C., preferably about 245° C. to about 290° C. and most preferably about 250° C. to about 270° C., until a polyester having the desired degree of polymerization, determined by I.V., is obtained. The polycondensation step may be conducted under reduced pressure which ranges from about 400 mm Hg (torr) to about 0.1 mm Hg (torr).

To ensure that the reaction of the glycol component and dicarboxylic acid component by an ester interchange reaction mechanism is driven to completion, it is preferred to employ a stoichiometric excess of glycol. For example, 3 moles and more preferably about 2.3 to about 2.6 moles of glycol component to one mole dicarboxylic acid component. It being understood, however, that the ratio of glycol component to dicarboxylic acid component is generally determined by the design of the reactor in which the polymerization reaction process occurs.

To prepare a copolyester by direct esterification, i.e., from the acid form of the dicarboxylic acid component, copolyesters are produced by reacting the acid form of the dicarboxylic acid component with the glycol component. For example, isophthalic acid and terephthalic acid could be directly reacted with the glycol component. A direct esterification reaction may be conducted at a pressure of from about 1 to about 200 pounds per square inch gauge pressure, preferably less than 100 psig to produce a low molecular weight, linear or branched polyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction.

To ensure that the reaction of the glycol component and dicarboxylic acid component by a direct esterification reaction mechanism is driven to completion, it is preferred to employ about 3.0 to 1.01 moles, more preferably 2.5 to 1.1 moles glycol component to one mole dicarboxylic acid component. It being understood, however, that the ratio of glycol component to dicarboxylic acid component will be determined by the design of the reactor in which the reaction process occurs.

Lower I.V. copolyesters are generally obtained by employing shorter residence times or slow reaction rates as compared to processes for forming higher I.V. copolyesters. For example, the reaction rate can be slowed by reducing the reaction temperature, reducing the catalyst concentration, by increasing the absolute pressure in the reactor or by a combination of these factors.

The process of forming the copolyesters of the invention may be conducted as a batch, semi-batch or continuous process. Advantageously the process is operated as a continuous process. Indeed, it is possible to produce superior coloration of the copolyester when using a continuous process as the copolyester may deteriorate in appearance if the copolyester is allowed to reside in a reactor at an elevated temperature for too long a duration.

Catalyst System

A variety of catalyst systems are useful in promoting the reaction of the glycol component and the dicarboxylic acid component. Generally, without the aid of a suitable catalyst, the above reactions do not proceed at a noticeable rate. Typically a catalyst system will contain catalytic materials and catalytic inhibitors.

Catalytic Materials

Catalytic materials which are suitable for the catalyst system include, but are not limited to, materials containing titanium, manganese, zinc, cobalt, antimony, gallium, lithium, calcium, silicon, and germanium. Such catalyst systems are described in U.S. Pat. Nos. 3,907,754, 3,962,189, 4,010,145, 4,356,299, 5,017,680, 5,668,243, and 5,681,918, herein incorporated by reference in their entirety. Generally, the catalyst system used to prepared the copolyesters of the invention comprises materials which contain titanium, manganese and/or zinc and mixtures thereof. While the amounts of the individual catalytic materials in the catalyst system will vary, it is desired that the total amount of catalytic materials in the catalyst system be below about 125 ppm, preferably below about 100 ppm and most preferably below about 80 ppm. The "ppm" for catalytic materials in the catalyst system and the catalytic inhibitor described below, refers to the weight of the element referred to and is based upon the weight of the final copolyester product.

While titanium catalytic materials may be added in the form of complexed materials such as those described in U.S. Pat. No. 5,017,680, the titanium catalytic materials are preferably added in the form of an alkoxide in an amount ranging from about 10 to about 35 ppm, more preferably about 10 to about 25 and most preferably about 12 to about 20 ppm. Indeed, copolyesters formed with lower levels of titanium catalytic materials have better stability when held in the melt. Suitable titanium alkoxides include, but are not limited to, acetyl triisopropyl titanate, tetraisopropyl titanate and tetraisobutyl titanate. Particularly preferred titanium catalytic materials include acetyl triisopropyl titanate and tetraisopropyl titanate. The titanium catalytic material may be added to the reaction process prior to direct esterification or ester interchange reaction or prior to the polycondensation reaction.

Manganese is typically added in the form of a salt, such as an organic acid salt in an amount ranging from about 0 to 70 ppm, preferably about 20 to about 70 ppm, more preferably about 30 to about 70 ppm and most preferably about 40 to about 70 ppm. Examples of suitable manganese salts include, but are not limited to, manganous benzoate tetrahydrate, manganese chloride, manganese oxide, manganese acetate, manganese acetylacetonate, and manganese succinate. Manganese is added to the reaction process prior to a direct esterification or ester interchange reaction.

Zinc may be added to the catalyst system in addition to the manganese or in place of the manganese catalyst. Zinc is typically added in the form of a salt in an amount ranging from 0 to 100 ppm, preferably about 25 to about 100 ppm and more preferably about 50 to about 80 ppm. Examples of suitable zinc compounds include, but are not limited to, zinc acetate, zinc succinate, and zinc alkoxide. Zinc is typically added to the reaction process prior to an ester interchange reaction.

If desired, a cobalt catalytic material, may also be employed as part of the catalyst system. When employed, cobalt is typically added in the form of a salt, such as an organic acid salt. Examples of suitable cobalt salts include, but are not limited to, cobaltous acetate trihydrate, cobaltous nitrate, cobaltous chloride, cobalt acetylacetonate, cobalt naphthenate, and cobalt salicylate. Cobalt may be added in an amount of up to about 100 ppm, more preferably up to about 90 ppm. As described below, the cobalt may function as both a catalytic material and as a colorant. As a colorant, cobalt is generally added to the reaction process after a direct esterification or ester interchange reaction. As cobalt is generally used as a colorant, the amount of cobalt is not considered when calculating the total amount of catalytic material.

In some embodiments antimony may be employed, however, it is preferred that the catalysts not contain antimony. Indeed, it is preferred that the copolyesters of the invention, and the fibers and binder fibers formed therefrom, do not contain any antimony catalytic materials. When used, however, suitable antimony compounds include, but are not limited to, antimonate esters of inorganic acids, antimony oxide, antimony alkoxides such as antimony isopropoxide, antimony halide, such as antimony chloride, antimony bromide and antimony fluoride, sodium or potassium antimonate, antimony carboxylates, such as antimony acetate and antimony glycolate or mixtures thereof. Preferably the antimony component is an antimony glycolate or an antimony oxide. Antimony is generally added after the ester interchange or a direct esterification reaction. When the copolyester is used to form binder fibers, antimony may be omitted from the catalyst system due to deposit buildup on the spinnerette face caused by the presence of an antimony containing catalyst.

While less preferred, calcium, gallium and silicon catalytic materials may be used in the catalyst system. Examples of suitable calcium compounds include, but are not limited to, calcium acetate, calcium glycoxide, and calcium phosphate monohydrate. Examples of suitable gallium catalytic materials include, but are not limited to, gallium chloride, gallium nitrate hydrate, gallium oxide, gallium lactate and gallium phosphide. Examples of suitable silicon catalytic materials include, but are not limited to, silicon acetate and tetraethyl orthosilicate. Germanium catalytic materials include, but are not limited to oxides, organic salts and in particular glycolates of germanium.

A preferred ester interchange catalyst system for reacting dicarboxylic acid component esters with glycols with glycols contains titanium, manganese, and optionally cobalt, materials. In the ester interchange catalyst system, the titanium is present in an amount ranging from about 10 to about 35 ppm, preferably about 10 to about 25 ppm and the manganese is present in an amount ranging from about 30 to about 70 ppm. Additionally, in another embodiment of the ester interchange catalyst system, the total amount of catalytic materials in the ester interchange catalyst system is less than or equal to about 125 ppm, preferably less than about 100 ppm, more preferably less than about 80 ppm and most preferably less than 70 ppm. A preferred ester interchange catalyst system is typically used in combination with a catalytic inhibitor comprising about 40 to about 90 ppm phosphorus; and a colorant in an effective amount, for example, about 2 to about 10 ppm of a blue and/or red substituted anthraquinone dye. Generally, the preferred ester interchange catalyst system is substantially free of zinc catalytic materials, more preferably contains less than 5 ppm zinc catalytic materials and most preferably is free of zinc catalytic materials. Additionally, when binder fibers are desired, the preferred ester interchange catalyst system is substantially free of antimony catalytic materials, more preferably contains less than 5 ppm antimony catalytic materials and most preferably is free of antimony catalytic materials.

Catalytic Inhibitor

To stabilize the effects of the catalyst system and to promote efficiency of zinc, manganese and cobalt catalytic materials, it is desirable to add a phosphorus catalytic inhibitor to the reaction process after an ester interchange or direct esterification reaction but prior to conducting the polycondensation reaction step. Typically, phosphorus is added in the form of a phosphate, such as phosphoric acid or an organic phosphate ester in an amount ranging from about 40 to 90 ppm and more preferably ranging from about 60 to 75 ppm. Suitable phosphate esters for use in this invention include, but are not limited to, ethyl acid phosphate, diethyl acid phosphate, triethyl phosphate, arylalkyl phosphates and tris-2-ethylhexyl phosphate. One useful phosphate catalytic inhibitor is sold under the Merpol® A tradename which is commercially available from Du Pont de Nemours of Wilmington, Del.

Colorants

In forming the copolyesters of the invention, colorants, sometimes referred to as toners, may be added to impart a desired neutral hue and/or brightness to the resulting copolyester. When colored copolyesters are desired, pigments or colorants may be included in the reaction mixture during the reaction of the glycol component and the dicarboxylic acid component or they may be melt blended with the preformed copolyester. A preferred method of including colorants is to copolymerize a thermally stable organic colorant having reactive groups such that the colorant is incorporated into the copolyester to improve the hue of the copolyester. For example, colorants such as dyes possessing reactive hydroxyl and/or carboxyl groups, including, but not limited to, blue and red substituted anthraquinones, may be copolymerized into the polymer chain. Colorants and dyes are described in detail in U.S. Pat. Nos. 4,521,556, 4,740,581, 4,749,772, 4,749,773, 4,749,774, 4,950,732, 5,252,699, 5,384,377, 5,372,864, 5,340,910 and 5 5,681,918, herein incorporated by reference in their entirety. When dyes are employed as colorants, they may be added to the copolyester reaction process after an ester interchange or direct esterification reaction. Furthermore, when a dye or dye mixture is employed as the toner colorant for the copolyester, it is preferred that the total amount of dye is less than 10 ppm. Additionally, in a preferred embodiment of the invention, the colorant is free of cobalt, i.e., the colorant employed produces the desired color in the absence of cobalt.

Alternatively, inorganic pigments, such as titanium dioxide and cobalt containing materials, may be added to the reaction. Advantageously when a catalyst material contains cobalt, the cobalt may also act as a colorant. Care must be taken to control the amount of cobalt in order to avoid opacity and dinginess in the copolyesters of the invention. To control the amount of opacity and dinginess, cobalt may be employed in an amount ranging up to about 90 ppm.

Copolyesters of the Invention

The copolyester of the invention is formed such that the resulting copolyesters have excellent thermoplastic flow and bonding capability. Typically, the inherent viscosities of less than about 0.7 dl/g when employing greater than 10 mole % isophthalic acid, anhydride, acid chloride or ester thereof and less than about 0.6 dl/g when employing less than about 10% isophthalic acid or acid, anhydride, acid chloride or ester thereof.

When the dicarboxylic acid component contains greater than or equal to about 10 mole % isophthalic acid, anhydride, acid chloride or ester thereof the copolyesters of the invention have an inherent viscosity, I.V., ranging from about 0.36 to about 0.80, however, for binders fiber use the copolyester has an I.V. generally ranging from about 0.36 to about 0.70, more preferably about 0.40 to about 0.66, even more preferably about 0.40 to about 0.58 and most preferably about 0.40 to about 0.52.

When the dicarboxylic acid component contains less than about 10 mole % isophthalic acid, anhydride, acid chloride or ester thereof the copolyesters of the invention have an inherent viscosity, I.V., ranging from about 0.36 to 0.58. Preferably such copolyesters of the invention have an I.V. ranging from about 0.38 to about 0.58, more preferably about 0.4 to about 0.53, more preferably about 0.40 to about 0.51.

The I.V. of the copolyesters of the invention may be determined by measuring the I.V. at 25° C. using 0.5 g polymer per 100 mL of a solvent consisting of 60% by weight phenol and 40% by weight tetrachloroethane. The basic method of determining the I.V. of a copolyester is set forth in ASTM D-2857-70. The copolyesters produced with the lower I.V. values possess excellent color as they are clearer than previous copolyesters and may accept dyes more easily than higher I.V. copolyesters. Furthermore, low I.V. copolyesters are more easily dyed at lower temperatures and typically more easily printed than similar higher I.V. copolyesters. Additionally, since the copolyesters of the invention may have low I.V. values, the production rates of the copolyesters are quite rapid.

The copolyesters of the invention, especially low I.V. copolyesters, are capable of bonding activation at lower temperatures and have improved melt flow at lower temperatures than previous copolyesters, as measured by the Kayeness instrument, which is similar to the Tinius Olsen Indexer. This improved melt flow may beneficially result in stronger bonds at lower temperatures or shorter exposures and allows for higher manufacturing speeds in the nonwoven bonding activation step. The use of lower bonding temperatures aids in minimizing detrimental effects to higher melting point fibers when they are blended with the polyesters of the invention. For example, the use of lower bonding temperatures aids in the reduction of discoloration, shrinkage, loss of crimp and resiliency, change of tactile aesthetics, less volatilization and smoking of fiber finishes.

The polymerization of the dicarboxylic acid component and the glycol component may be controlled to form either crystalline or amorphous polyethylene terephthalate copolyesters with glass transition temperatures similar or slightly lower than that of polyethylene terephthalate. The selection and amount of the dicarboxylic acid components and the glycol components will generally determine if the resulting copolyester is amorphous or crystalline. As is known in the art, amorphous polymers generally have higher clarity and are not opaque like many crystalline polymers. Therefore, while some of the 1,3- or 1,4-cyclohexanedimethanol and isophthalic acid levels employed may form crystalline copolyesters, the superior clarity of amorphous polyesters provides some distinct advantages.

Methods for determining the degree of crystallinity are known in the art, for example, differential scanning calorimetry (DSC), density gradient tubes, and x-ray diffraction techniques. Methods for determining crystallinity are discussed in U.S. Pat. No. 5,643,991, herein incorporated by reference in its entirety. Although any method known in the art would be acceptable to determine the degree of crystallinity, the differential scanning calorimetry method is preferred. For DSC analysis, a sample is heated and the temperature is monitored. A crystallization transition and/or crystalline melting transition is observed for upon heating a crystalline material. A crystalline polymer will have a well defined crystalline melting peak and temperature. In contrast, an amorphous material will have no crystallization or crystalline melting transition., i.e., no definite melting point. The degree of crystallinity is generally determined by measuring the area under the endotherm peak.

Generally, a lower I.V. copolyester will have a lower extrusion temperature. Hence, copolyesters of the invention may advantageously be melt spun into fibers at a lower temperature. For example an isophthalic copolyester of the invention with an I.V. of 0.47 may be melt spun at a temperature of approximately about 235° C. whereas a similar non-isophthalic containing copolyester with an I.V. of 0.6 to 0.7 generally requires fiber spinning at a temperature of 275–285° C. Typically, a copolyester of the invention is melt spun at a temperature of less than about 265° C., in some cases as low as about 235° C. These copolyesters can be melt spun through a spinnerette with about 332 holes and a hole size of about 0.55 mm. Generally, the melt spinning pressures will vary from about 1000 psig to 2000 psig.

Typically, the clarity and color (hue) of the copolyesters may be evaluated using a standard spectrocolorimeter. For example, a suitable spectrocolorimeter for evaluating the clarity and color of the copolyester is a HunterLab UltraScan which is commercially available from HunterLab of Reston, Va. Through the use of a HunterLab UltraScan spectrocolorimeter, the clarity and color, i.e., yellowness and/or blueness may be quantified. The use of a HunterLab UltraScan spectrocolorimeter for evaluating and quantifying the color and clarity of a copolyester is described in U.S. Pat. No. 5,681,918, herein incorporated by reference in its entirety. When using the HunterLab UltraScan an L★ value indicates the level of clarity with higher L★ values representing higher levels of clarity. The level of yellowness and/or blueness is quantified as a b★ value with 0.0 representing neutral, whereas values above 0.0 indicate levels of yellowness and values below 0.0 indicate the level of blueness in the copolyester. The copolyesters of the invention typically have an L★ value of more than about 65 and a b★ value varying from between about −2.5 to about +2.5.

Products Formed from Copolyesters of the Invention

The copolyesters of the invention may be used to form an article of manufacture or be used as an additive, such as a compounding additive concentrate or master batch for another polymer system. In addition, binder fibers and other articles may be formed with the copolyesters that include, but are not limited to, automotive and structural preforms containing glass, polyester or other fibers, molded parts, sheeting and extruded films and fibers. The inventive copolyesters may be part of the articles to be formed or may form the entire article.

Conventional additives may be added to the copolyesters of the invention, depending upon the desired end use of the copolyester. Suitable additives for the copolyesters are described in detail in U.S. Pat. Nos. 5,608,031 and 5,773,554 herein incorporated by reference in their entirety. Typical additives for the polyesters include pigments, antioxidants, stabilizers, flame retardants, mold release agents, nucleating agents, tougheners, epoxy compounds, impact modifiers, adhesion promoters, conducting or antistatic agents, wetting agents, liquid repellent agents, free radical stabilizers, other surface modifiers, lubricants, viscosity modifiers, dye promoters and other processing agents.

A preferred article of the invention is a fiber. The fiber may be prepared in any desired length known in the art and generally in the form of a continuous filament or staple fiber. Fibers may be made from the copolyesters of the invention through any conventional means available including, but not limited to, melt spinning into fibers or directly into fabrics, the latter including spunbond and melt blown nonwovens. Depending upon the end use, any desired denier may be formed with the fibers employing copolyesters of the invention, including fibers having a denier value ranging from microdenier to about 50 denier, preferably up to about 20 denier, most preferably about 1.5 to about 15 denier.

Fibers formed by extruding and spinning the inventive copolyesters are easier to dye and are deeper dyeing as compared to polyethylene terephthalate homopolymers when employing the same aqueous dyeing conditions. Indeed, dyeing of the inventive copolyesters to a deeper depth of shade is possible when employing similar dyeing conditions. Conversely, the same depths of shade can be achieved with lower dyeing costs as compared to the dyeing of polyethylene terephthalate homopolymers.

The copolyesters may be used to form fibers, such as binder fibers, in any desired configuration known in the art. The copolyesters of the invention are preferably binder fibers having the form of, or incorporated into a fibrous structure. A major advantage of binder fibers is that bonded products containing the binder fibers can be obtained by applying heat, radio frequencies or ultrasonic frequencies to a web or unbonded batt of filaments. Upon activation the copolyester softens and flows and upon cooling forms a solid bond with neighboring fibers. Indeed, the copolyesters of the invention are particularly suited for use as binder fibers as the copolyesters possess a lower I.V. which allows better flow and softening properties at lower temperatures. Hence, improved bonding of the binder fiber is possible at lower temperatures than previously known binder fibers for nonwoven fabrics when employing binder fibers containing the copolyesters of the invention. Indeed, the binder fibers formed from the copolyesters of the invention are particularly suited for bonding to polyester, acrylic, nylon, glass, cellulosic fibers, such as cotton and pulp-based fibers, and scoured wool. Typically, the binder fibers formed with the copolyesters of the invention will have deniers of about 1.5 to about 20. However, other fibrous forms such as melt blown webs or spunbonded materials may have microdenier sizes.

The binder fibers of the invention may be in the form of unicomponent or bicomponent binder fibers or other multicomponent forms. For example, tricomponent fibers are also a possibility, utilizing a variety of polymers and polymer variants, sometimes with the intermediate layer being a tie-layer to promote interfacial adhesion. The tie-layer can be the polyester of the invention or blends of this polyester with other polymers. Similarly, the polyester of this invention can be used as a tie-layer in laminating and extrusion coating.

Bicomponent binder fibers may have a sheath/core, side by side, or other configuration known in the art. For example, shaped binder fibers may be formed with the cross-sectional legs capped with binder materials during extrusion. The process of preparing and bonding a low melt temperature bicomponent binder fiber is described in detail in U.S. Pat. No. 3,589,956, herein incorporated by reference in its entirety. In a bicomponent fiber of the invention, the copolyesters of this invention will be present in amounts of about 10 to about 75 weight % of the bicomponent fiber. The other component may be from a wide range of other polymeric materials including, but not limited to polyesters such as polyethylene terephthalate, polycyclohexylenedimethylene terephthalate, polytrimethylene terephthalate, polybutylene terephthalate and polylactic acid based polymers or mixtures thereof. Bicomponent binder fibers may be blended with other fibers or used alone to make nonwoven fabrics and high loft battings having various properties. Generally, bicomponent binder fibers contain a polymer having a high melting point to ensure structural integrity during the bonding process and a lower melting or amorphous polymer to bond the matrix in nonwoven fabrics. Alternatively, economics may dictate that a much less expensive core material be used.

Binder fibers from this invention are readily blended with a wide range of other fibers and subsequently heat or energy activated to provide nonwoven fabrics having good integrity and strength. For example, other fibers in the blends could include, but are not limited to polyester, acrylic, nylon, glass, cellulosic (cotton, pulp-based fibers, cellulose ester fibers etc.) and other similar synthetic and natural fibers. Incorporation in nonwovens can also aid lamination to other fabrics, films and some metallic surfaces. The amount of binder fiber in the nonwoven blend will generally be in the range of about 5 to about 30 weight %, although amounts as little as 2 weight % can also be used. In some instances fabrics are formed using 100% binder fibers.

Another fibrous structure which may be made with the copolyesters of the invention is a fiber which is formed by melt blending less than about 50% of the copolyester with a polyolefin, a functionalized polyolefin or a polyester other than the inventive copolyester. When melt blending, suitable compatibilizers may be employed for their desired effects. The melt blended copolyester/polyolefin or melt blended copolyesters may be spun as a fiber to form a fibrous structure. This melt blending allows polyolefins to be spun in a natural state and dyed in separate subsequent operations, something which cannot be satisfactorily achieved with unmodified polypropylene.

The polyesters may also be used as an additive in polyethylene terephthalate (PET), polytrimethylene terephthalate (PTT), polybutylene terephthalate (PBT), polycyclohexylenedimethylene terephthalate (PCT) or polyethylene napthalenedicarboxylate (PEN) and other polyesters to enhance fiber disperse dye uptake and make it deeper dyeable, thus improving the depth of shading with the same amount of dye under same conditions employed for dyeing polyesters other than those of the invention, for example a polyethylene terephthalate polymer having the same I.V. This technique can also enhance printability and improve wetting as compared to a polyethylene terephthalate polymer having the same I.V.

The fibrous structures of the invention are particularly useful for processing into a wide variety of nonwoven, knitted and tufted textiles for a variety of application, but are particularly suitable for the manufacture of bonded, nonwoven and textiles, either quilted or unquilted, which may be activated by a variety of means. They are also suitable for use in making a wide variety of products including, but not limited to, high loft battings, needlepunched fabrics, flat nonwovens, hydroentangled fabrics, stitch-bonded fabric (to minimize pilling), wet-laid non-woven fabrics and paper, filter media, face masks, scatter rugs, cotton carpeting, cellulosic insulation, absorbent products, fiberglass composites, pillow fillings, fillings for sleeping bags, cushions, quilts, comforters, coverlets, mattresses, mattress pads, mattress covers, furniture and auto upholstery, bedspreads, pile fabrics for industrial and apparel uses, blankets, women's robes, sport jackets, car coats, interlinings, outerwear, floor covering materials, tiles, carpets, bath mats, foot and handwear, ribbons, decorative yarns and fabrics, and molded articles.

Another suitable use for the polyesters of the invention is as a compounding carrier material. For example, the polyester of the invention may be mixed with additives, including colorants, to form a concentrate or masterbatch where the polyester is a carrier material. This concentrate or masterbatch may be combined with another polymer in a later process to provide color, opacity, flame retardancy or other beneficial properties. Polyesters of the invention will accept higher levels of additives, such as pigments, than polyethylene terephthalates of similar inherent viscosities. The polyester may be blended or mixed by any suitable technology known in the art.

The polyesters of the invention may be blended with a wide range of other polymers as a component of the masterbatches but not the carrier material. Such other polymers include other polyesters, polyamides, cellulose esters, polycarbonates, polyolefins and the like. Such masterbatches may subsequently be blended with more of the same or different polymers to be used in fibers, molded articles, sheeting or films to alter or to enhance properties. Copolyesters of the invention will accept higher levels of additives, such as pigments, than polyethylene terephthalates of similar inherent viscosities. The copolyester may be blended or mixed by any suitable technology known in the art. The copolyesters of the invention may be in the form of an additive which is a melt blend of the inventive copolyesters and a first polymer, wherein the additive when blended with a second polymer, which may be the same or different than the first polymer, is capable of forming a fiber. Thus, any fiber which contains, in whole or in part, the polyesters of the invention, is encompassed by this invention.

The following examples are intended to illustrate, but not limit, the scope of the present invention.

EXAMPLES

Example 1

Low Catalyst, Low I.V. Copolyesters for Binder Fibers

A comparison was made between copolyesters formed with an I.V. of 0.59 and a low I.V. of 0.47. The copolyester formed with the higher I.V. of 0.59 was made using a catalyst system with a high concentration of catalytic materials. In contrast, the copolyesters formed with the low I.V. of 0.47 were formed using a catalyst system having a low concentration of catalytic materials.

A low I.V. copolyester containing about 31 mole % 1,4 cyclohexanedimethanol and about 69 mole % ethylene glycol was prepared from 1,4 cyclohexanedimethanol, ethylene glycol and dimethyl terephthalate. The reaction was conducted with an excess of the glycol component. The reaction proceeded by first conducting an ester interchange reaction step followed by a polycondensation reaction step. The ester interchange reaction was conducted at a temperature ranging from 190° C. to 240° C. and a pressure of 15 to 40 psig in the presence of a catalyst system containing 16 ppm Ti (as tetraisopropyl titanate) and 46 ppm Mn (as manganese acetate). The product of the ester interchange reaction was subjected to a polycondensation reaction step where the temperature started at from 250° C. to 260° C. and ended at 269° C. to 282° C. Likewise the pressure for the polycondensation reaction started at 75 to 200 torr and finished at 0.3 to 2.5 torr. Prior to commencing a polycondensation step, less than about 10 ppm of a mixture of blue and red anthraquinone dyes was added to the catalyst system and a catalytic inhibitor comprising Merpol® A from Du Pont was added in an amount of about 70 ppm P.

The high I.V. copolyester, I.V. 0.59, was prepared to have the same composition as the low I.V. copolyesters. As with the low I.V. copolyesters, the reaction proceeded by first conducting an ester interchange reaction step followed by a polycondensation reaction step. The ester interchange reaction was conducted at a temperature ranging from 190° C. to 240° C. and a pressure of 15 to 40 psig in the presence of a catalyst system containing 56 ppm Ti (as tetraisopropyl titanate) and 46 ppm Mn (as manganese acetate). Prior to commencing a polycondensation step, 56 ppm cobalt acetate was added to the catalyst system and a catalytic inhibitor comprising Merpol® A from Du Pont was added to provide 79 ppm P. The product of the ester interchange reaction was subjected to a polycondensation reaction step where the temperature started at from 250° C. to 260° C. and ended at 275° C. to 285° C. The pressure for the polycondensation reaction started at 75 to 200 torr and finished at 0.3 to 2.0 torr. The use of a longer reaction time was required to obtain the higher I.V. copolyester.

A HunterLab UltraScan spectrocolorimeter was employed for evaluating and quantifying the color and clarity of the two copolyesters:

TABLE 1

| IV | L★ Color | b★ Color |
|---|---|---|
| 0.47 | 69–72 | −0.5–+0.5 |
| 0.59 | 64.2 | 2.7 |

As evident from Table 1, the lower I.V. copolyesters formed with the low catalyst concentration systems possessed superior clarity and color.

Example 2

Bond Strengths for Binder Fibers Made with Low and High I.V. Copolyesters

Copolyester pellets having an I.V of 0.47 and containing about 31 mole % 1,4 cyclohexanedimethanol and about 69 mole % ethylene glycol were prepared from 1,4 cyclohexanedimethanol, ethylene glycol and dimethyl terephthalate under reaction conditions similar to that of example 1. The catalyst system used to form the low I.V. pellets contained 35 ppm Ti (as tetraiosopropyl titanate) and 46 ppm Mn (as manganese acetate), 50 ppm cobalt acetate while the catalytic inhibitor comprised Merpol® A from Du Pont in an amount of 70 ppm P.

The 0.47 I.V. copolyester pellets were dried in a rotary dryer at 65° C. for 4 hours. Unicomponent binder fibers were formed from the low and high I.V. copolyester pellets by melt extruding the pellets into multifilament fibers of 9 denier/filament. The filaments were formed using a spinnerette having 332 holes (0.55 mm orifices), a melt temperature of 233° C. and a take-up speed of 100 m/m. The copolyester pellets of I.V. 0.59 from example 1, were likewise formed into unicomponent binder fibers, except that the pellets were spun at a melt temperature of 275° C.

The as-spun fibers were subsequently drafted in a 2-stage process (70° C. water, followed by a heated chamber), 3:1 total draft ratio, and stuffer box crimped to 7 crimps/inch and an 88 degree crimp angle. The resulting 3 denier filament fiber was then lubricated with a water-based finish and oven dried.

Both the low I.V. 0.49 and high I.V. 0.59 copolyester unicomponent binder fibers were combined with 75% polyethylene terephthalate fibers to form 3 oz/yd² intimately blended carded nonwoven fabrics. The nonwoven fabrics were activated and subjected to bonding strength testing by bonding the intimately blended nonwoven on a press, with the upper and lower heated plates contacting the nonwoven with pressure. Activation was 30 seconds at temperatures ranging from 200 to 275° F. One-inch wide strips were used to obtain the Instron tensiles at a 5-inch gauge length. The results of the bond strength tests are presented in detail in Table 2 below.

TABLE 2

PET/Uni-Component Nonwoven Samples

| Activation Temp. ° F. | Avg. Break Force, g | Avg. Elongation, % | Avg. Modulus, g/d |
|---|---|---|---|
| Nonwoven Fabric w/Binder Fiber from 0.47 I.V. Copolyester | | | |
| 200 | 333 | 12.0 | 12,637 |
| 225 | 820 | 4.1 | 61,637 |
| 250 | 2899 | 15.3 | 116,625 |
| 275 | 4837 | 22.6 | 97,984 |
| Nonwoven Fabric w/Binder Fiber from 0.59 I.V. Copolyester | | | |
| 200 | 35 | 18.5 | 481 |
| 225 | 196 | 5.0 | 9,273 |
| 250 | 617 | 6.9 | 29,340 |
| 275 | 2366 | 15.4 | 71,949 |

Similar testing was also conducted with a coextruded sheath/core bicomponent binder fiber, having a 35% . 41 I.V. copolyester binder sheath and a 65% polyethylene terephthalate core having about 4 denier. Similar results were obtained.

Example 3

Bond Strengths Testing of Binder Fibers

Unicomponent binder fibers were formed from a terephthalate copolyester containing 31 mole % 1,4 cyclohexanedimethanol, 69% ethylene glycol and a dicarboxylic acid component containing 100 mole % dimethyl terephthalate.

A first unicomponent binder fiber was formed from a first copolyester which was formed in the presence of a catalyst system having a low level of catalytic materials. For the first copolyester, an ester interchange reaction step occurred in the presence of a catalyst system containing 35 ppm Ti (as tetraiosopropyl titanate) and 46 ppm Mn (as manganese acetate). Prior to commencing a polycondensation step, 50 ppm Co (as cobalt acetate) was added to the catalyst system and a catalytic inhibitor comprising Merpol® A from Du Pont was added in an amount of 70 ppm P. The first copolyester was formed with an I.V. of 0.47 and possessed a denier of about 3.

A second unicomponent binder fiber was formed from the copolyester pellets of example 1 having an I.V. of 0.47. The 0.47 I.V. copolyester pellets of example 1 were formed in the presence of a lower concentration catalyst system, 16 ppm Ti and 46 ppm Mn. The second unicomponent binder fiber possessed a denier of about 3.

The first and second unicomponent binder fibers were combined with polyethylene terephthalate fibers having a denier of 6 to form a nonwoven fabric. The binder fiber comprised 25% of the nonwoven fabric with the polyethylene terephthalate fibers comprising the other 75%. The nonwoven web containing the binder fibers activated and subjected to bonding strength testing by the procedures described in Example 2 above, except that the upper and lower plates were gapped to allow touch contact, without any pressure registering on the pressure gauge. The results of the bond strength tests are set forth below in Table 3.

TABLE 3

| Activation Temp. ° F. | Avg. Break Force, g | Avg. Elongation, % | Avg. Modulus, g/d |
|---|---|---|---|
| Nonwoven Fabric w/Binder Fiber from First Copolyester | | | |
| 300 | 2,591 | 18 | 31,636 |
| 325 | 2,476 | 26 | 17,340 |
| Nonwoven Fabric w/Binder Fiber from Second Copolyester | | | |
| 300 | 2,434 | 17 | 45,586 |
| 325 | 2,661 | 21 | 27,966 |

As shown by the above Table 3, the use of differing levels of catalyst materials within the scope of the invention did not appear to significantly affect the binding strength of the binder fibers made with similar inherent viscosities.

Example 4

Unicomponent binder fibers were formed from copolyesters containing 31 mole % 1,4 cyclohexanedimethanol, 69% ethylene glycol and a dicarboxylic acid component containing 100 mole % dimethyl terephthalate. A first unicomponent binder fiber was made from the low I.V., lower catalyst second copolyester of example 3. A second unicomponent binder fiber was made from the copolyester of example 1 having an I.V. of 0.59. Both the first and second unicomponent binder fibers were made by the process described in example 2. Intimately blended carded nonwoven fabrics were made from the first and second unicomponent binder fibers by process described in example 2. Bond strength testing was performed similar to that described in example 3. The results of the bonds strength testing are presented below in TABLE 4.

TABLE 4

| Activation Temp. ° F. | Avg. Break Force, g | Avg. Elongation, % | Avg. Modulus, g/d |
|---|---|---|---|
| Nonwoven Fabric w/Binder Fiber from 0.47 I.V. Copolyester | | | |
| 225 | 133 | 7 | 5,841 |
| 250 | 393 | 6 | 15,827 |
| 275 | 883 | 12 | 29,362 |
| 300 | 2434 | 17 | 45,586 |
| 325 | 2661 | 21 | 27,966 |
| Nonwoven Fabric w/Binder Fiber from 0.59 I.V. Copolyester | | | |
| 225 | 45 | 20 | 652 |
| 250 | 219 | 5 | 7,947 |
| 275 | 590 | 12 | 15,372 |
| 300 | 1,748 | 22 | 20,433 |
| 325 | 2,640 | 29 | 17,902 |

As shown by table 4, the binder fibers formed with the lower I.V. of 0.47 possessed higher bond strength at lower activation temperatures.

Example 5

Viscosity PET Copolyester Containing 30/70 cis/trans mixture of 1,4-cyclohexanedimethanol A polyethylene terephthalate copolyester was formed from a glycol component and a dicarboxylic acid component. The glycol component contained 31 mole % of a 30/70 cis/trans mixture of 1,4-cyclohexanedimethanol, and 69 mole % ethylene glycol. The dicarboxylic acid component comprised 100 mole % dimethyl terephthalate. The polyethylene terephthalate copolyester was prepared by a melt phase polycondensation process using a catalyst system containing 32 ppm Ti, 46 ppm Mn, 50 ppm Co and 70 ppm P. The polyethylene terephthalate copolyester formed had an I.V. of 0.50.

Pellets of this copolyester were dried at 60° C, for 2 hours and then melt extruded into multifilament fibers of 9 denier/filament using a spinnerette having 332 holes (0.55 mm orifice) at a take-up speed of 1000 m/m, a melt spinning temperature of 240° C. and an extrusion rate of 43 pounds per hour. A velocity of 145 cubic feet per minute was used to quench the filaments during extrusion. The as-spun fibers were subsequently drafted in a one-stage drawing process using a 68° C. water bath. The fibers were stuffer box crimped to provide 7.5 crimps per inch and a crimp angle of 90 degrees using a clapper setting of 9.5 psi with no live steam. The fiber was dried in a relaxed state at 60° C. for 2 minutes. The resultant staple fiber was determined to have 3 denier per filament.

Good results were similarly achieved when the copolyester was not dried prior to the spinning operation.

Fibers were also readily produced from PET copolyesters containing 22 mole % CHDM (I.V. 0.40) or 45 mole % CHDM (I.V. 0.49).

Example 6

Preparation of Nonwoven Web

A 3 denier per filament, unicomponent binder fiber from Example 5 was blended with polyethylene terephthalate staple fibers (2¼ denier per filament) to provide a blend containing 20 weight % binder fiber. A 1¼ oz/yd$^2$ intimately blended nonwoven web was formed by carding. The nonwoven web was bonded by conveying the web through an infrared oven, followed by hot nipping (80° C.). Good machine and cross direction tensile strength and drapeability were obtained.

Good bonding was also obtained by passing the web from the card through an air flow-through oven at 150° C. for a two minute dwell time.

Binder fibers from the compositions of this invention were determined to be ultrasonic and radio frequency activatable.

Example 7

Preparation of a Brightly Colored Nonwoven Web

A 1½ oz/yd$^2$ nonwoven web fabric was produced similar to Example 6; however, the matrix polyester was colored red. The clear, non-opaque bonds provided by the unicomponent binder fiber from Example 5 minimally affected the brightness of the shade. This is an advantage over isophthalic modified polyethylene terephthalate copolyester binder fibers which do not contain cyclohexanedimethanol which generally are more opaque and often contribute to a frosty, hazy looking appearance on dyed goods.

Example 8

Sheath/Core Bicomponent Fiber

A 50/50 sheath/core bicomponent fiber was made using polyethylene terephthalate homopolymer (I.V. 0.54) as the core and a polyethylene terephthalate copolyester similar to that in Example 5 (I.V. 0.41) as the sheath. The bicomponent fiber was formed as follows: Crystallized, dried pellets of PET were melted in an extruder and fed as the core at a melt temperature of 295° C. Dried pellets of PET copolyester were transported to the feed hopper of the extruder feeding the sheath melt stream. The sheath stream was extruded at a melt temperature of 225° C. The molten streams are coextruded through a spinnerette having a sheath/core hole configuration at metering rates adjusted to produce fibers having a 50% copolyester sheath/50% PET core. A similar 35/65 sheath/core bicomponent fiber was also produced in filament and staple form. The fibers were drawn with draw roll speeds to produce 4 denier per filament fibers which were then crimped and cut into staple fibers (51 mm long).

These bicomponent binder fibers are useful in making nonwoven fabrics and high loft battings in combinations with polyethylene terephthalate and/or other matrix staple fibers. These binder fibers can also be used in 100% form.

Example 9

Low Viscosity PET Copolyester Containing Isophthalic Acid and 30/70 cis/trans mixture of 1,4-cyclohexanedimethanol A polyethylene terephthalate (PET) copolyester containing 20 mole % isophthalic acid (IPA) and 20 mole % 1,4-cyclohexanedimethanol (CHDM) is prepared in a melt phase polycondensation using a catalyst system containing 25 ppm Ti, 40 ppm Mn, 55 ppm Co and 60 ppm P. This copolyester has an I.V. of 0.55.

Pellets of this copolyester are dried at 50° C. for 2 hours and then are melt extruded into multifilament fibers of 9 denier/filament using a spinnerette having 332 holes (0.55 mm orifice) at a take-up speed of 1000 m/m, a melt temperature of 265° C. and an extrusion rate of 43 pounds per hour. An air flow of 145 cubic feet per minute is used to quench the filaments during extrusion. The as-spun fibers are subsequently drafted in a 3:1 draft ratio and continue in a one stage drawing process using a 68° C. water bath and steam chest into which 0.5 psi live steam is injected. The fibers are stuffer box crimped to provide 7 crimps per inch and a crimp angle of 95 degrees using a clapper setting of 9.5 psi with no steam. The fiber is dried in a relaxed state at 60° C. for 2 minutes. The resultant staple fiber is 3.2 denier per filament.

The as-spun, undrawn form of the above fiber is also an effective binder fiber. For example, a 4 d/f as-spun binder fiber is especially suitable for lightweight nonwovens where low shrinkage is desirable. Similarly, beneficial results are achieved when the copolyester pellets are not dried prior to the spinning operation.

Fibers can also be readily produced from PET copolyesters formed with 12 mole % IPA and 28 mole % CHDM (I.V. 0.48) or 30 mole % IPA and 8 mole % CHDM (I.V. 0.60).

Example 10

Preparation of Nonwoven Web

A 3 denier per filament, unicomponent binder fiber from Example 1 is blended with PET staple fibers (2¼ denier per filament) to provide a blend containing 20 weight % binder fiber. The 1¼ oz/yd² intimately blended nonwoven web is formed on a carding line. The binder fibers in the nonwoven web are activated by conveying the web through an infrared oven, followed by hot nipping (80° C.) to bond the fibers to the nonwoven web. Good machine and cross direction tensile strength and drapeability are obtained. Good bonding is also obtained by passing the web from the card through an air circulating oven at 150° C. for a two minute dwell time.

Binder fibers from the compositions of this invention are also radio frequency activatable. Similarly beneficial results are achieved when the binder fiber is a 1,4-cyclohexanedicarboxylic acid (PEC) copolyester containing 15 mole % isophthalic acid and 15 mole % CHDM or a naphthalenedicarboxylic acid (PEN) copolyester containing 10 mole % isophthalic acid and 25 mole % CHDM.

Example 11

Sheath/Core Bicomponent Fiber

A 50/50 sheath/core bicomponent fiber is made using polyethylene terephthalate homopolymer (I.V. 0.54) as the core and a polyethylene terephthalate copolyester similar to that in Example 1 (I.V. 0.47) as the sheath. The bicomponent fiber is formed as follows:

Crystallized, dried pellets of PET are melted in an extruder and fed as the core at a melt temperature of 288° C. Dried pellets of PET copolyester are transported to the feed hopper of the extruder feeding the sheath melt stream. The sheath stream is extruded at a melt temperature of 250° C. The molten streams are coextruded through a spinnerette having a sheath/core hole configuration at metering rates adjusted to produce fibers having a 50% copolyester sheath/50% PET core. The fibers are drawn with draw roll speeds to produce 4 denier per filament fibers. A similar 40/60 sheath/core bicomponent fiber is also produced in filament and staple form. For staple, the fibers are then crimped and cut into 38 mm lengths.

These bicomponent binder fibers are useful in making nonwovens, composites and other formed materials when incorporated or combined with polyethylene terephthalate, glass and/or other matrix fibers, fabrics or films. For some nonwoven structures, these binder fibers can also be used in 100% form.

Example 12

Low Viscosity PET Copolyester Containing IPA and CHDM

Using the catalyst system described in Example 1, a PET copolyester containing 11 mole % IPA and 13 mole % CHDM is prepared. This copolyester has an I.V. of 0.58. Dried samples of this copolyester are melt spun using the technique described in Example 1 to provide as-spun multifilament binder fibers of 12 d/f. These fibers are drafted, crimped and cut to provide staple fibers of 3.5 d/f. These binder fibers are blended with PET fibers to form a blend containing 15 weight % binder fiber. The blend is bonded by passing it through an infrared oven as described in Example 2.

Filament fibers are also readily melt spun from the copolyester of this example to provide filaments of 6 d/f. These filaments are readily intermingled or continuously blended with glass at a 7% binder fiber level, chopped into staple or roving which is then formed into a composite structure and thermally activated.

Example 13

Low Viscosity PET Copolyester Containing CHDM

A 0.40 I.V. copolyester containing about 31 mole % 1,4-cyclohexanedimethanol and about 69 mole % ethylene glycol was prepared from 1,4-cyclohexanedimethanol, ethylene glycol and dimethyl terephthalate. The reaction of the dicarboxylic acid component and glycol component was conducted with an excess of the glycol component. In particular, the reaction proceeded by first conducting an ester interchange reaction step followed by a polycondensation reaction step. The ester interchange was conducted at a temperature ranging from 190° C. to 240° C. and at a pressure of 15 to 40 psig in the presence of a catalyst system containing 16 ppm Ti (as tetraisopropyl titanate) and 46 ppm Mn (as manganese acetate). Prior to commencing the polycondensation step, about 10 ppm of a mixture of blue and red anthraquinone toner dyes was added to the reaction mixture and a catalytic inhibitor comprising Merpol® A (available from DuPont) was added in the amount of about 70 ppm P. The product of the ester interchange reaction was subjected to a polycondensation reaction step where the temperature started from 245° C. to 255° C. and ended at 255° C. to 270° C. Likewise, the pressure for the polycondensation reaction started at 75 to 200 torr and finished at 0.3 to 4.0 torr.

A unicomponent binder fiber was formed from the above polyester pellets. Binder fiber (6 denier, uncrimped) was into ¼-inch (6 mm) staple fibers. The binder fiber, at 15% by weight, was blended with fluff pulp in an air laid nonwoven. The resulting 500 g/sq m nonwoven, after a through-air oven activation of the binder, exhibited significantly increased dry and wet tensile and rupture strengths, compared to the fluff pulp only controls. Similar improvements were also observed in a wet laid cellulosic nonwoven, using a 3 denier unicomponent binder fiber made from the 0.40 I.V. copolyester.

We claim:

1. A fiber comprising a copolyester formed from the reaction product of:
   a glycol component with a dicarboxylic acid component,
   wherein the glycol component comprises 1,3- or 1,4-cyclohexanedimethanol in an amount ranging from about 5 to about 60 mole % and ethylene glycol in an amount ranging from about 40 to about 95 mole %,
   wherein the dicarboxylic acid component comprises at least about 50 mole % of a dicarboxylic acid component which is an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof, and
   wherein the copolyester has an I.V. of between about 0.36 to 0.58.

2. The fiber of claim 1, wherein the copolyester does not contain any antimony catalytic materials.

3. The fiber of claim 1, wherein the copolyester is formed in the presence of up to about 20 mole % of at least one amine compound selected from the group consisting of aminoalcohols, aminoacids, diamines, lactams and mixtures thereof.

4. The fiber of claim 1, wherein the fiber is a bicomponent binder fiber, the bicomponent fiber comprising:
   25 to about 90 % by weight of a polymeric core portion; and
   about 10 to about 75 % by weight of a sheath portion comprising the reaction product of the glycol component and the dicarboxylic acid component.

5. The bicomponent fiber of claim 4, wherein the core portion is a polymeric material selected from the group consisting of polyethylene terephthalate, polycyclohexylenedimethylene terephthalate, polytrimethylene terephthalate, polybutylene terephthalate or mixtures thereof.

6. The fiber of claim 1, wherein the fiber is a melt blend of the polyester with another polyester, a polyolefin or a functionalized polyolefin.

7. A binder fiber comprising a copolyester formed from the reaction product of:
   a glycol component with a dicarboxylic acid component and up to 20 mole % of an amine compound,
   wherein the glycol component comprises 1,3- or 1,4-cyclohexanedimethanol in an amount ranging from about 5 to about 60 mole %, ethylene glycol in an amount ranging from about 40 to about 95 mole %,
   wherein the dicarboxylic acid component comprises at least about 50 mole % of a dicarboxylic acid component which is an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof, and
   wherein the copolyester has an I.V. of between about 0.36 to 0.58.

8. The binder fiber of claim 7, wherein the amine compound is selected from the group consisting of aminoalcohols, aminoacids, diamines, lactams and mixtures thereof.

9. The binder fiber of claim 7, wherein the dicarboxylic acid component is an ester or mixture of esters of terephthalic acid, isophthalic acid, naphthalenedicarboxylic acid or 1,3- or 1,4-cyclohexanedicarboxylic acid.

10. The binder fiber of claim 7, wherein the I.V. value of the copolyester ranges from about 0.40 to about 0.52.

11. The binder fiber of claim 7, wherein the copolyester is formed in the presence of a catalyst system comprising about 10 to about 35 ppm Ti, about 0 to about 70 ppm Mn, about 0 to about 90 ppm Co and in the presence of a catalytic inhibitor comprising about 40 to about 90 ppm P based on the weight of the copolyester.

12. The binder fiber of claim 7, wherein the copolyester does not contain any antimony catalytic materials.

13. The binder fiber of claim 7, wherein the binder fiber is a unicomponent binder fiber.

14. The binder fiber of claim 7, wherein the fiber is a multicomponent binder fiber having side by side configuration.

15. The binder fiber of claim 7, wherein the fiber is multicomponent fiber and wherein the polyester is a tie layer adhesion promoter.

16. The binder fiber of claim 7, wherein the binder fiber may be activated by heat, ultrasonic frequencies and radio frequencies.

17. The binder fiber of claim 7, wherein the binder fiber has a denier ranging from about 20 to microdenier sizes and wherein the binder fiber is either a unicomponent or bicomponent binder fiber.

18. The binder fiber of claim 7, wherein the binder fiber is capable of being dyed to a deeper shade than a polyethylene terephthalate fiber having the same I.V.

19. Melt blends of polyesters or copolyesters with the binder fibers described in claim 7, wherein the combination is capable of accepting higher concentrations of additives than a polyethylene terephthalate polymer having the same I.V.

20. Melt blends of other polyesters with the binder fibers described in claim 7, wherein the fiber is capable of being dyed to a deeper shade than a polyethylene terephthalate fiber.

21. A fiber comprising a copolyester formed from the reaction product of:

a glycol component with a dicarboxylic acid component, wherein the glycol component comprises 1,3- or 1,4-cyclohexanedimethanol in an amount ranging from about 5 to 60 mole % and ethylene glycol in an amount ranging from about 40 to about 95 mole %, wherein the dicarboxylic acid component comprises isophthalic acid or an anhydride, acid chloride or ester thereof in an amount ranging from at least 10 mole % to about 50 mole % and at least about 50 mole % of a dicarboxylic acid component which is an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof.

22. The fiber of claim 21, wherein the copolyester does not contain any antimony catalytic materials.

23. The fiber of claim 21, wherein the copolyester is formed in the presence of up to about 20 mole % of at least one amine compound selected from the group consisting of aminoalcohols, aminoacids, diamines, lactams and mixtures thereof.

24. The fiber of claim 21, wherein the fiber is a bicomponent binder fiber, the bicomponent fiber comprising:

about 25 to about 90 % by weight of a polymeric core portion; and about 10 to about 75 % by weight of a sheath portion comprising the reaction product of the glycol component and the dicarboxylic acid component.

25. The bicomponent fiber of claim 24, wherein the core portion is a polymeric material selected from the group consisting of polyethylene terephthalate, polycyclohexylenedimethylene terephthalate, polytrimethylene terephthalate, polybutylene terephthalate, polylactic acid or mixtures thereof.

26. The fiber of claim 21, wherein the fiber is a melt blend of the polyester with another polyester, a polyolefin or a functionalized polyolefin.

27. A binder fiber comprising a copolyester formed from the reaction product of:

a glycol component with a dicarboxylic acid component and up to about 20 mole % of an amine compound, wherein the glycol component comprises 1,3- or 1,4-cyclohexanedimethanol in an amount ranging from about 5 to 60 mole %, ethylene glycol in an amount ranging from about 40 to about 95 mole %, wherein the dicarboxylic acid component comprises isophthalic acid or an anhydride, acid chloride or ester thereof in an amount ranging from at least 10 mole % to about 50 mole % and at least about 50 mole % of a dicarboxylic acid component which is an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof.

28. The binder fiber of claim 27, wherein the amine compound is selected from the group consisting of aminoalcohols, diamines, lactams and mixtures thereof.

29. The binder fiber of claim 27, wherein the dicarboxylic acid component contains at least 50 mole % of an ester or mixture of esters of terephthalic acid, naphthalenedicarboxylic acid or 1,3- or 1,4-cyclohexanedicarboxylic acid.

30. The binder fiber of claim 27, wherein the I.V. of the copolyester ranges from 0.4 to about 0.66.

31. The binder fiber of claim 27, wherein the copolyester is formed in the presence of a catalyst system comprising about 10 to about 35 ppm Ti, about 0 to about 70 ppm Mn, about 0 to about 90 ppm Co and in the presence of a catalytic inhibitor comprising about 40 to about 90 ppm P based on the weight of the copolyester.

32. The binder fiber of claim 27, wherein the copolyester does not contain any antimony catalytic materials.

33. The binder fiber of claim 27, wherein the binder fiber is a unicomponent binder fiber.

34. The binder fiber of claim 27, wherein the fiber is a multicomponent binder fiber having side by side configuration.

35. The binder fiber of claim 27, wherein the fiber is multicomponent fiber and wherein the polyester is a tie layer adhesion promoter.

36. The binder fiber of claim 27, wherein the binder fiber may be activated by heat, ultrasonic frequencies and radio frequencies.

37. The binder fiber of claim 27, wherein the binder fiber has a denier ranging from about 20 to microdenier sizes and wherein the bicomponent fiber is either a unicomponent or bicomponent binder fiber.

38. The binder fiber of claim 27, wherein the binder fiber is capable of being dyed to a deeper shade than a polyethylene terephthalate fiber having the same I.V.

39. Melt blends of polyesters or copolyesters with the binder fibers described in claim 27, wherein the combination is capable of accepting higher concentrations of additives than a polyethylene terephthalate polymer having the same I.V.

40. Melt blends of other polyesters with the binder fibers described in claim 27, wherein the fiber is capable of being dyed to a deeper shade than a polyethylene terephthalate fiber.

41. A copolyester formed from the reaction product of:

a glycol component with a dicarboxylic acid component, wherein the glycol component comprises 1,3- or 1,4-cyclohexanedimethanol in an amount ranging from about 5 to about 60 mole % and ethylene glycol in an amount ranging from about 40 to about 95 mole %, wherein the dicarboxylic acid component comprises at least about 50 mole % of a dicarboxylic acid component which is an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof; and wherein the copolyester has an I.V. of between about 0.36 to 0.58 and wherein the copolyester is formed in the presence of a catalyst system comprising up to about 35 ppm Ti.

42. A copolyester formed from the reaction product of:

a glycol component with a dicarboxylic acid component, wherein the glycol component comprises 1,3- or 1,4-cyclohexanedimethanol in an amount ranging from about 5 to 60 mole % and ethylene glycol in an amount ranging from about 40 to about 95 mole %, wherein the dicarboxylic acid component comprises isophthalic acid or an anhydride, acid chloride or ester thereof in an amount ranging from at least 10 mole % to about 50 mole % and at least about 50 mole % of a dicarboxylic acid component which is an acid, anhydride, acid chloride or ester of an aromatic dicarboxylic acid containing from about 8 to about 14 carbon atoms, an aliphatic dicarboxylic acid containing from about 4 to about 12 carbon atoms, a cycloaliphatic dicarboxylic acid having about 8 to about 12 carbon atoms or mixtures thereof; and wherein the copolyester is formed in the presence of a catalyst system comprising up to about 35 ppm Ti.

* * * * *

UNITED STATES PATENT AND TRADEMARK OFFICE
CERTIFICATE OF CORRECTION

PATENT NO. : 6,231,976 B1
DATED : May 15, 2001
INVENTOR(S) : Leron R. Dean et al.

It is certified that error appears in the above-identified patent and that said Letters Patent is hereby corrected as shown below:

Column 2,
Line 57, delete "25";
Line 61, delete "propanediol";

Column 3,
Line 42, delete "5";

Column 4,
Line 25, delete "10";
Line 26, "2,2,4-trimethyl-1,3-propanediol" should read -- 2,2,4-trimethyl-1,3-pentanediol --;
Line 54, "napthalenedicarboxylic" should read -- naphthalenedicarboxylic --;

Column 7,
Line 21, "prepared" should read -- prepare --;

Column 8,
Line 48, delete "with glycols";

Column 11,
Line 4, delete "for";
Line 45, "Copolvesters should read -- Copolyesters --;

Column 13,
Line 43, "napthalenedicarboxylate" should read -- naphthalenedicarboxylic --;
Line 54, "application" should read -- applications --;

Column 16,
Line 1, "denier filament" should read -- denier/filament --;
Line 4, "0.49" should read -- 0.47 --;
Line 53, "tetriospropyl" should read -- tetraisopropyl --;

Column 17,
Line 4, "The nonwoven web containing the binders fibers activated" should read -- The nonwoven web containing the binder fibers was activated --.
Line 64, insert -- Low --;

UNITED STATES PATENT AND TRADEMARK OFFICE
CERTIFICATE OF CORRECTION

PATENT NO.   : 6,231,976 B1
DATED        : May 15, 2001
INVENTOR(S)  : Leron R. Dean et al.

It is certified that error appears in the above-identified patent and that said Letters Patent is hereby corrected as shown below:

Column 21,
Line 22, "was into" should read -- was cut into --; and
Line 61, "25 to about 90% by weight of a polymeric core portion;" should read -- about 25 to about 90% by weight of a polymeric core portion; --.

Signed and Sealed this

Second Day of July, 2002

Attest:

JAMES E. ROGAN
Attesting Officer  Director of the United States Patent and Trademark Office